US012700413B2

(12) United States Patent
Vair et al.

(10) Patent No.: US 12,700,413 B2
(45) Date of Patent: Aug. 4, 2026

(54) FREQUENCY MAPPING IN THE VOICEPRINT DOMAIN

(71) Applicant: Microsoft Technology Licensing, LLC, Redmond, WA (US)

(72) Inventors: Claudio Vair, Borgone Susa (IT); Haydar Talib, Montreal (CA); Kevin Robert Farrell, Brick, NJ (US); Daniele Ernesto Colibro, Alessandria (IT)

(73) Assignee: Microsoft Technology Licensing, LLC, Redmond, WA (US)

( * ) Notice: Subject to any disclaimer, the term of this patent is extended or adjusted under 35 U.S.C. 154(b) by 228 days.

(21) Appl. No.: 17/678,405

(22) Filed: Feb. 23, 2022

(65) Prior Publication Data

US 2023/0267936 A1 Aug. 24, 2023

(51) Int. Cl.
| | |
|---|---|
| *G10L 17/18* | (2013.01) |
| *G06N 3/047* | (2023.01) |
| *G10L 17/00* | (2013.01) |
| *G10L 17/04* | (2013.01) |
| *G10L 17/20* | (2013.01) |

(52) U.S. Cl.
CPC ............ *G10L 17/18* (2013.01); *G06N 3/047* (2023.01); *G10L 17/00* (2013.01); *G10L 17/04* (2013.01); *G10L 17/20* (2013.01)

(58) Field of Classification Search
CPC ......... G10L 17/18; G10L 17/00; G10L 17/04; G10L 17/20; G06N 3/047
USPC ........................................................ 704/232
See application file for complete search history.

(56) References Cited

U.S. PATENT DOCUMENTS

| | | | | |
|---|---|---|---|---|
| 6,988,066 B2 * | 1/2006 | Malah | .................... | G10L 21/038 704/200 |
| 11,985,179 B1 * | 5/2024 | Tacer | ...................... | G10L 21/00 |
| 2012/0201399 A1 * | 8/2012 | Mitsufuji | ............ | G10L 21/0388 381/98 |
| 2014/0233725 A1 * | 8/2014 | Kim | ........................ | H04M 3/22 379/414 |

(Continued)

FOREIGN PATENT DOCUMENTS

| | | | | |
|---|---|---|---|---|
| CN | 113516987 A | * | 10/2021 | ............. G10L 17/02 |
| CN | 113611295 B | * | 7/2024 | ............. A61B 5/165 |

OTHER PUBLICATIONS

E. Variani, E. McDermott and G. Heigold, "A Gaussian Mixture Model layer jointly optimized with discriminative features within a Deep Neural Network architecture," 2015 IEEE International Conference on Acoustics, Speech and Signal Processing (ICASSP), 2015, pp. 4270-4274 (Year: 2015).*

(Continued)

*Primary Examiner* — Edwin S Leland, III
(74) *Attorney, Agent, or Firm* — Foley IP Law, PLLC

(57) ABSTRACT

There is provided a method that includes (a) obtaining a first voice vector that was derived from a signal of a voice that was sampled at a first sampling frequency, (b) obtaining a second voice vector that was derived from a signal of a voice that was sampled at a second sampling frequency, (c) mapping the second voice vector into a mapped voice vector in accordance with a machine learning model, and (d) comparing the first voice vector to the mapped voice vector to yield a score that indicates a probability that the first voice vector and the second voice vector originated from a same person.

20 Claims, 3 Drawing Sheets

(56) References Cited

U.S. PATENT DOCUMENTS

| | | | | |
|---|---|---|---|---|
| 2019/0043488 A1* | 2/2019 | Bocklet | .................. | G10L 15/22 |
| 2021/0005182 A1* | 1/2021 | Han | ........................ | G10L 15/16 |
| 2021/0182357 A1* | 6/2021 | Partee | ................... | G05B 17/02 |
| 2021/0183358 A1* | 6/2021 | Mao | ........................ | G10L 17/04 |
| 2021/0241776 A1* | 8/2021 | Sivaraman | ............. | G10L 17/04 |
| 2021/0264923 A1* | 8/2021 | Lesso | ...................... | G10L 17/02 |
| 2023/0005486 A1* | 1/2023 | Chen | ....................... | G10L 17/02 |
| 2023/0260531 A1* | 8/2023 | Srivastava | ............ | G10L 21/028 |
| | | | | 704/233 |
| 2023/0267936 A1* | 8/2023 | Vair | ....................... | G06N 3/047 |
| | | | | 704/232 |
| 2023/0371889 A1* | 11/2023 | Weston | ................... | G10L 25/30 |

OTHER PUBLICATIONS

Shahina et al., "Mapping Neural Networks for Bandwidth Extension of Narrowband Speech", Interspeech 2006, pp. 1435-1438.
Macho, Duan, "Narrowband to Wideband Feature Expansion for Robust Multilingual ASR", Interspeech 2007, pp. 1118-1121.
"International Search Report and Written Opinion Issued in PCT Application No. PCT/US23/060672", Mailed Date: Mar. 31, 2023, 12 Pages.
Chen et al., "Speaker Embedding Conversion for Backward and Cross-Channel Compatibility," ICASSP 2022—2022 IEEE International Conference on Acoustics, Speech and Signal Processing (ICASSP), May 23-27, 2022, 5 pages.

* cited by examiner

FIG. 2

FREQUENCY MAPPING IN THE VOICEPRINT DOMAIN

BACKGROUND OF THE DISCLOSURE

1. Field of the Disclosure

The present disclosure relates to a speaker recognition system, and more particularly, to a speaker recognition system that can receive voice data that was captured using a first sampling frequency, and match it to a voiceprint that was produced using a second sampling frequency. The proposed approach allows for improving speaker recognition accuracy when working with mixed bandwidth audio input, e.g., audio signals sampled at different sampling rates.

2. Description of the Related Art

The approaches described in this section are approaches that could be pursued, but not necessarily approaches that have been previously conceived or pursued. Therefore, the approaches described in this section may not be prior art to the claims in this application and are not admitted to be prior art by inclusion in this section.

In early days of automatic speech processing technology, most deployed applications were designed for the telephonic scenario. This was the case, for instance, for Interactive Voice Response (IVR) services and Voice Biometric authentication systems.

A voice signal in analog format was typically converted into a digital signal by using codecs with a sampling rate of 8 kilohertz (kHz). The digital signal was then transmitted over a band-limited channel that, for landline and for the first mobile networks, had a frequency bandwidth limited to no more than 4 kHz for the transmitted signal. The "narrowband" standard for telephone calls limited audio frequencies to a range from 300 hertz (Hz) to 3.4 kHz.

Today, the situation is more articulated. For instance, "wideband" exploits 16 kHz sampling rate codecs and provides a frequency range for communication from 50 Hz to 7 kHz. Wideband is widely used by Voice over IP (VoIP) protocols, for videoconferencing and mobile calls. Standards with even larger bandwidth have been defined by the International Telecommunication Union (ITU), e.g., "super-wideband" up to 14 kHz and "fullband" up to 20 kHz. The greater bandwidth improves the perceived quality of the signal and allows increasing the accuracy of the automatic speech processing systems that can leverage the information included in the extended bandwidth.

However, there are scenarios where mixed bandwidth may occur. This is particularly true for contact centers reachable through a variety of channels, including landline and mobile phones, Web applications, smartphone applications, etc. This situation adds complexity to the automatic speech processing technology and limits the benefit of the wider bandwidth.

Regarding the Voice Biometric field, a Voice Biometric system is typically developed for a given sampling frequency. For telephonic applications, parametric speaker recognition models are trained by exploiting 8 kHz narrowband audio segments. For multimedia application or wideband channels, the 8 kHz models can be used by downsampling the audio segments to 8 kHz. However meaningfully better accuracy can be achieved by developing wideband speaker recognition systems, typically trained with 16 kHz audio segments. For these reasons voice biometric technology providers often offer differentiated speaker recognition models for 8 kHz telephonic applications and 16 kHz wideband applications.

When an application involves both narrowband and wideband data, the approach used so far and known in the prior art consists of downsampling the wideband data and using the narrowband speaker recognition model across all the application. Upsampling the narrowband data to wideband, in order to use it with the wideband speaker recognition model, commonly results in suboptimal accuracy due to the lack of information in the upper frequency bands of the upsampled signal. It is worth nothing that using the upsampled narrowband signal with a wideband speaker recognition system produces worse accuracy than working with the narrowband speaker recognition system. On the other hand, by working with the narrowband speaker recognition system, one loses the ability to take advantage of the better quality of the available wideband speech samples.

A typical example of the mixed bandwidth condition is an application where users enroll their biometric profiles (voiceprints) from a landline network, so, using an 8 kHz narrowband channel, but they can authenticate themselves through a wideband channel, for instance using a smartphone application.

For dealing with the mixed bandwidth condition just described, a conventional speaker recognition system would work with an 8 kHz speaker recognition configuration and would downsample the wideband signal from 16 kHz to 8 kHz to match the voiceprint features. While this solution is commonly used in deployed applications, it is not able to exploit the additional voice information available in the wideband signal and that could be potentially exploited to improve the speaker recognition accuracy.

SUMMARY OF THE DISCLOSURE

The present document discloses a system that addresses the above-noted mixed bandwidth condition, by mapping speaker recognition voiceprints from narrowband to wideband, and recovering the accuracy benefit that is provided by the wideband bandwidth.

The system performs a method that includes (a) obtaining a first voice vector that was derived from a signal of a voice that was sampled at a first sampling frequency (e.g., wideband), (b) obtaining a second voice vector that was derived from a signal of a voice that was sampled at a second sampling frequency (e.g., narrowband), (c) mapping the second voice vector into a mapped voice vector in accordance with a machine learning model, and (d) comparing the first voice vector to the mapped voice vector to yield a score that indicates a probability that the first voice vector and the second voice vector originated from a same person.

The terms "biometric information", "voice biometrics" and "biometric profile" are used in the present document with the following meanings:

"biometric information" is personal data resulting from specific technical processing relating to the physical, physiological or behavioral characteristics of a natural person, which allow or confirm the unique identification of that natural person.

"voice biometrics" is the science of using a person's voice as a uniquely identifying biological characteristic in order to authenticate or identify the person.

"biometric profile" represents the actual model of the biometric information for a particular subject. Examples of biometric profiles include fingerprints, facial measurements, and voiceprints.

Present state of the art speaker recognition technology is based on DNN Embedding (xVector), which extracts voice biometric information from an audio segment by encoding it in a small floating-point vector, typically 200-600 elements. The biometric analysis is performed by comparing pairs of xVectors. This means that the narrowband to wideband mapping approach described herein can be interchangeably applied across enrollment and verification segments. This allows the mapping approach to address conditions where the enrollment for creating the voiceprints is performed on wideband audio while the verification segments came from narrowband channels, in addition to the mapping of the narrowband enrollment voiceprints to wideband models.

BRIEF DESCRIPTION OF THE DRAWINGS

FIG. 2 is block diagram of a speaker recognition system in the system of FIG. 1, showing further details of speaker recognition engine.

A component or a feature that is common to more than one drawing is indicated with the same reference number in each of the drawings.

DESCRIPTION OF THE DISCLOSURE

Speaker verification is an operation of determining whether a speaker is who he claims to be.

Figure 1:
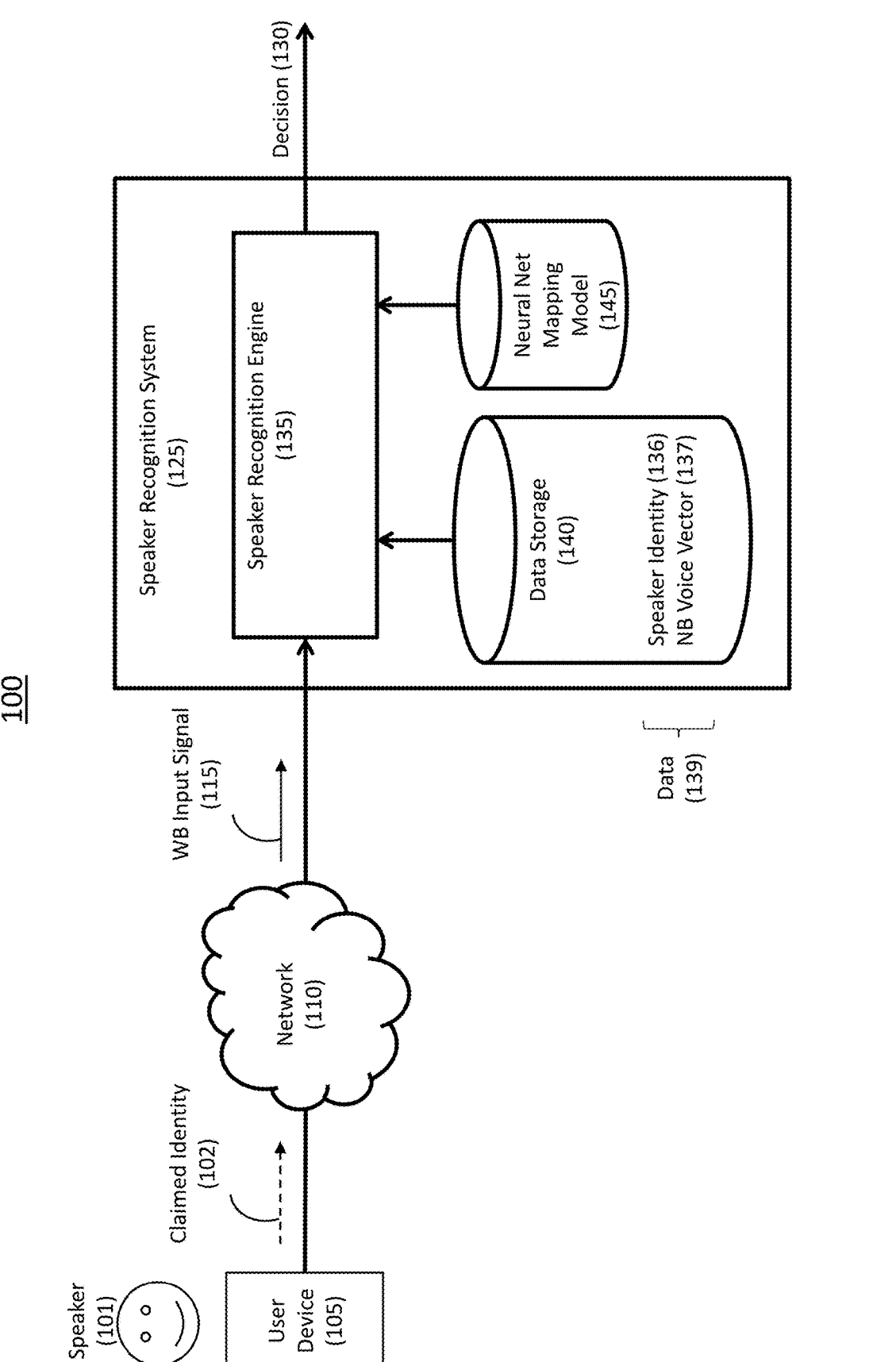
FIG. 1 is a block diagram of a system that employs voice biometrics for speaker verification.

FIG. 1 is a block diagram of a system 100 that employs voice biometrics for speaker verification.

System 100 operates in an environment that includes some signals being sampled at an 8 kHz sampling rate, and some signals being sampled at a 16 kHz sampling rate. In the present document we refer to 8 kHz as narrowband (NB), and 16 kHz as wideband (WB).

System 100 includes a user device 105 and a speaker recognition system 125 that are communicatively coupled via a network 110.

Network 110 is a data communications network. Network 110 may be a private network or a public network, and may include any or all of (a) a personal area network, e.g., covering a room, (b) a local area network, e.g., covering a building, (c) a campus area network, e.g., covering a campus, (d) a metropolitan area network, e.g., covering a city, (e) a wide area network, e.g., covering an area that links across metropolitan, regional, or national boundaries, (f) the Internet, or (g) a telephone network. Communications are conducted via network 110 by way of electronic signals and optical signals that propagate through a wire or optical fiber, or are transmitted and received wirelessly.

Speaker recognition system 125 includes a speaker recognition engine 135, a data storage 140, and a neural net mapping model 145.

A speaker 101 is a person who previously enrolled with speaker recognition system 125 during an enrollment process. In the enrollment process, speaker 101's voice was sampled at a sampling rate of 8 kHz and converted to an NB voice vector 137, and NB voice vector 137 was paired with a speaker identity 136 for speaker 101. Thus, NB voice vector 137 is an 8 kHz voice vector and has an associated speaker identity 136.

Data storage 140 is a computer-readable storage device, e.g., a hard drive or solid state memory. Speaker identity 136 and NB voice vector 137 were saved to data storage 140, and will be used for speaker verification. Speaker identity 136 and NB voice vector 137 are herein referred to collectively as data 139.

User device 105 is a device such as a cell phone or computer, into which speaker 101 speaks, thus presenting speech. User device 105 samples user 101's voice at a sampling rate of 16 kHz, and converts the speech into a WB input signal 115 that is communicated, via network 110, to speaker recognition system 125. Thus, WB input signal 115 is a 16 kHz signal that represents the voice of speaker 101.

When speaker recognition system 125 is performing speaker verification, speaker 101 declares his "claimed identity", represented herein as claimed identity 102. Speaker recognition engine 135 uses claimed identity 102 to retrieve, from data storage 140, the NB voice vector 137 that has the associated speaker identity 136 that matches claimed identity 102. The speaker verification task has the goal of confirming whether claimed identity 102 actually matches the true speaker identity.

Speaker recognition system 125 receives WB input signal 115 and renders a decision 130 concerning the voice of speaker 101.

Speaker recognition engine 135 compares WB input signal 115 to one or more voiceprints retrieved from data storage 140. Recall that voice vectors in data storage were sampled at 8 kHz, but in contrast, WB input signal is a 16 kHz signal. Thus, speaker recognition engine 135 has an NB-to-WB matching capability. To perform this NB-to-WB matching capability, speaker recognition engine 135 utilizes neural net mapping model 145.

Neural net mapping model 145 is a mapping model for transforming an NB voice vector, e.g., NB voice vector 137, into an approximated WB voice vector.

Decision 130 is indicative of whether voice characteristics extracted from WB input signal 115 match voice characteristics represented by a biometric profile (voiceprint), i.e., data 139, stored in data storage 140, for claimed identity 102.

Speaker recognition system 125 includes electronic circuitry that performs operations to execute methods or processes described herein, e.g., operations performed by speaker recognition engine 135. The circuity may be implemented with any or all of (a) discrete electronic components, (b) firmware, or (c) a programmable circuit that includes a processor and a memory. Such a processor is an electronic device configured of logic circuitry that responds to and executes instructions. Such a memory is a tangible, non-transitory, computer-readable storage device encoded with a computer program. In this regard, the memory stores data and instructions, i.e., program code, that are readable and executable by the processor for controlling operations of the processor. The memory may be implemented in a random-access memory (RAM), a hard drive, a read only memory (ROM), or a combination thereof.

Such a processor and memory may be implemented in a computer. The computer can be a standalone device or coupled to other devices in a distributed processing system.

Additionally, the program code may be configured on a storage device for subsequent loading into the memory. Such a storage device is a tangible, non-transitory, computer-readable storage device, and examples include (a) a compact disk, (b) a magnetic tape, (c) a read only memory, (d) an optical storage medium, (e) a hard drive, (f) a memory unit consisting of multiple parallel hard drives, (g) a universal serial bus (USB) flash drive, (h) a random-access memory, and (i) an electronic storage device coupled to the components of speaker recognition system 125 via network 110.

The program code may be configured in one or more modules. The term "module" is used herein to denote a functional operation that may be embodied either as a stand-alone component or as an integrated configuration of a plurality of subordinate components. Thus, a module may be implemented as a single module or as a plurality of modules that operate in cooperation with one another.

Figure 2:
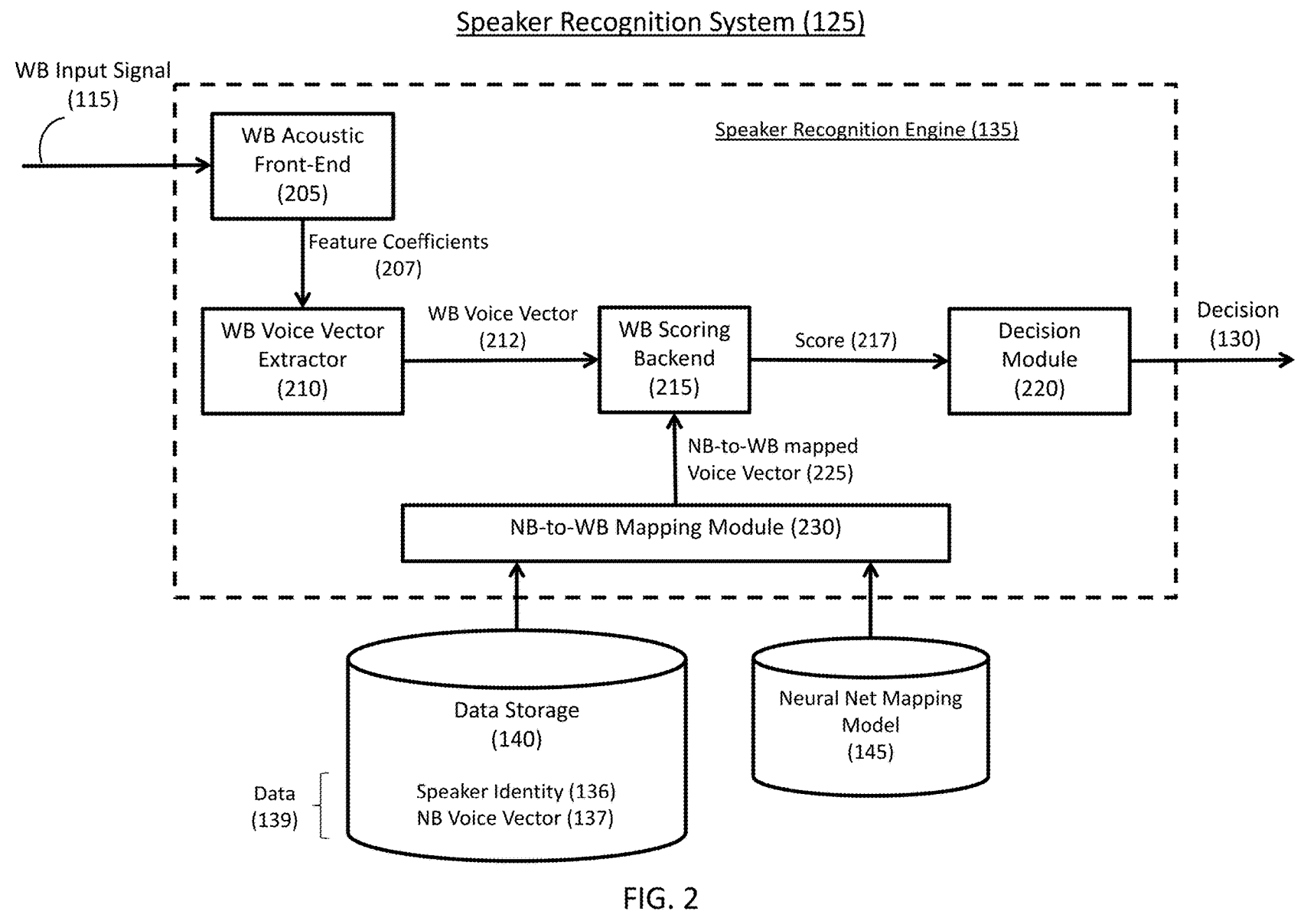

FIG. 2 is block diagram of speaker recognition system 125, showing further details of speaker recognition engine 135. Speaker recognition engine 135 includes a WB acoustic front-end 205, a WB voice vector extractor 210, a WB scoring backend 215, a decision module 220, and an NB-to-WB mapping module 230.

Speaker recognition system 125 operates on input signals in small chunks, known as frames with an approximate duration of 10 ms per frame. The raw input signal from each frame can be transformed by applying classical signal processing techniques for producing small dimension vectors of acoustic features for each frame.

WB acoustic front-end 205 extracts acoustic features from WB input signal 115, and outputs them as feature coefficients 207. Examples of acoustic features used for speaker recognition include Mel frequency cepstral coefficients (MFCCs), logarithmic Mel bands (log Mel bands), linear prediction cepstral coefficients (LPCC), and perceptual linear predictive (PLP) cepstral coefficients.

WB voice vector extractor 210 receives feature coefficients 207, and outputs a WB voice vector 212. WB voice vector 212 is a vector of floating-point values that conveys biometric information of a speaker. iVectors and DNN-Embeddings (xVector) are examples of voice vectors. In a case of DNN-Embeddings, WB voice vector extractor 210 is a Deep Neural Network (DNN), which extracts biometric information from feature coefficients 207. A conventional DNN-based voice vector extractor includes three functional blocks: (a) an encoder implemented with multiple neural network layers working frame by frame; (b) a temporal pooling layer to compute an aggregated measure from the frame-level feature vectors produced by the encoder; and (c) a decoder to classify the input signal to speaker classes. One of the layers of the decoder is designed to be a bottleneck layer, the output of which is the so-called xVector speaker embedding. Examples of DNN architectures used for speaker recognition include Time Delay DNN (TDNN), Factorized TDNN (FTDNN). 2D-CNN ResNet34.

NB-to-WB mapping module 230 accesses data storage 140, and utilizes claimed identity 102 of speaker 101 to access speaker identity 136 and its associated NB voice vector 137. NB-to-WB mapping module 230 obtains NB voice vector 137, and processes NB voice vector 137 in accordance with neural net mapping model 145 to map NB voice vector 137 into a WB voice vector, i.e., NB-to-WB mapped voice vector 225, for example by performing a DNN-based vector-to-vector regression. Thus, NB-to-WB mapped voice vector 225 is a WB representation of NB voice vector 137.

WB scoring backend 215 compares WB voice vector 212 to NB-to-WB mapped voice vector 225, and computes a score 217 indicative of the probability that WB voice vector 212 and NB-to-WB mapped voice vector 225 are from a same person. WB scoring backend 215 can use a cosine scoring between WB voice vector 212 to NB-to-WB mapped voice vector 225, or it can implement other classifiers, for example, Probabilistic Linear Discriminant Analysis (PLDA), or Pairwise Support Vector Machine (PSVM).

Decision module 220 assesses score 217 to decide whether the voice characteristics extracted from WB input signal 115 match the voice characteristics represented by the biometric profile (voiceprint) represented by data 139. The match is determined by a decision-making criterion, such as, but not limited to, comparing score 217 to a threshold value. The threshold is tuned accordingly to the tradeoff between security and usability, minimizing the false acceptance rate for higher security setup, or the false rejection rate for higher usability setup. A lower threshold tunes speaker recognition engine 135 for user convenience, e.g., fewer genuine attempts are rejected, while a higher threshold prioritizes security, e.g., fewer impostor attempts are accepted. More advanced decision-making criteria can exploit additional information, such us audio quality, speech duration and spoofing indicators, and implement the decision by considering the biometric score and the additional input factors. Machine learning techniques can be leveraged to combine all input factors and produce the final decision. Decision module 220 outputs decision 130, which indicates whether speaker 101 is who he claims to be.

Speaker recognition engine 135, in a comparison with an NB speaker recognition model, takes advantage of richer information that is provided in NB-to-WB mapped voice vector 225, which is derived from the WB-sampled signals, and thus improves accuracy as compared to the NB speaker recognition model.

Although, in FIG. 2, NB-to-WB mapping is applied on-the-fly by NB-to-WB mapping module 230, the NB-to-WB mapping could be implemented in a batch mode. That is, NB-to-WB mapping module 230 could operate in a batch mode that processes data 139 and produces a database of NB-to-WB mapped voice vectors, similar to NB-to-WB mapped voice vector 225, that can be accessed by WB scoring backend 215. Thus, the NB-to-WB mapped Voice Vectors could be used as input for a "standard" WB speaker recognition system.

Although in FIG. 2, NB-to-WB mapping module 230 operates on data 139 from data storage 140, it is possible to apply a similar transformation to voice vectors extracted from an input signal that is other than WB input signal 115, for example, when the voice vectors in data storage 140 are already WB, while the input signal is NB.

Figure 3:
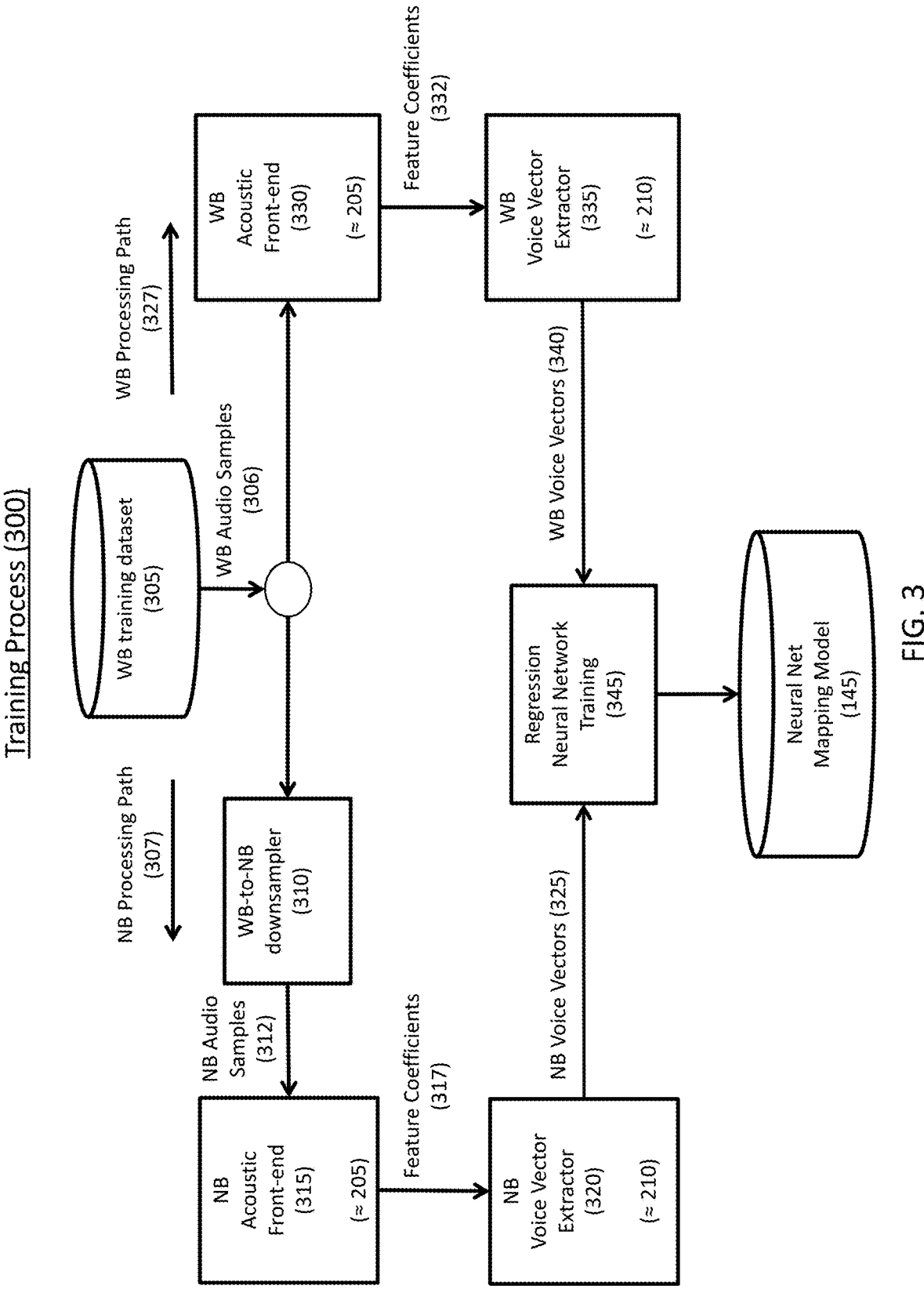
FIG. 3 is a block diagram of a process for training a neural net mapping model.

FIG. 3 is a block diagram of a process, namely training process 300, for training neural net mapping model 145. Training process 300 utilizes a WB training dataset 305, and proceeds with processing via (a) an NB processing path 307 to generate NB voice vectors 325, and (b) a WB processing path 327 to generate WB voice vectors 340.

WB training dataset 305 is a collection of WB audio samples (306). The collection of WB audio samples includes utterances from many different people, possibly covering different ages, gender, languages and dialects, and collected through a variety of channels (e.g., telephony, multimedia, web) and environments. Data augmentation techniques (i.e., artificial addition of noise, music, reverberation, and application lossy audio encoders) can be applied as well. The WB audio samples were produced using a wideband sampling frequency so that they can be used in training process 300 to produce both NB voice vectors 325 and WB voice vectors 340. NB voice vectors 325 and WB voice vectors 340 are input vectors and target vectors, respectively, for regression neural network training 345, which generates neural net mapping model 145.

NB processing path 307 includes a WB-to-NB downsampler 310, an NB acoustic front-end 315, and an NB voice vector extractor 320.

WB-to-NB downsampler 310 is a sampling rate converter that downsamples a WB signal into a NB signal, and thus, downsamples WB audio samples 306 into NB audio samples 312.

NB acoustic front-end 315 extracts feature coefficients from NB audio samples 312, and outputs them as feature coefficients 317. NB acoustic front-end 315 is operationally similar to WB acoustic front-end 205, but configured for processing NB signals.

NB voice vector extractor 320 receives feature coefficients 317, and outputs NB voice vectors 325, which are vectors of floating-point values. NB voice vector extractor 320 is operationally similar to WB voice vector extractor 210, but configured for processing NB vectors, and NB voice vectors 325 are similar to WB voice vector 212. NB voice vectors 325 are provided to regression neural network training 345.

WB processing path 327 includes a WB acoustic front-end 330, and a WB voice vector extractor 335.

WB acoustic front-end 330 extracts feature coefficients from WB audio samples 306, and outputs them as feature coefficients 332. WB acoustic front-end 330 is operationally similar to WB acoustic front-end 205.

WB voice vector extractor 335 receives feature coefficients 332, and outputs WB voice vectors 340. WB voice vector extractor 335 is operationally similar to WB voice vector extractor 210, and WB voice vectors 340 are similar to WB voice vector 212. WB voice vectors 340 are provided to regression neural network training 345.

Regression neural network training 345 receives input NB voice vectors 325 and target WB voice vectors 340 (in pairs), and trains neural net mapping model 145 to transform NB voice vectors 325 into approximated WB voice vectors that minimize distortion with respect to target WB voice vectors 340. The distortion can be measured, for instance, by utilization of a Maximum Absolute Error or a Mean Square Error as loss function. Neural networks trained for regression problems are utilized later for prediction purposes. The loss function is used to check how close estimates or forecasts are to actual values; the lower the loss, the closer the predicted value is to the actual value.

Training process 300 may be performed by a separate system, e.g., another computer system, from which neural net mapping model 145 is transferred to speaker recognition system 125.

Although system 100 is described as employing NB-to-WB mapping, i.e., 8 kHz to 16 kHz, system 100 can be utilized with any suitable sampling frequency pairs. Moreover, the mapping can be from a lower frequency to a higher frequency, or from a higher frequency to a lower frequency.

Above, we explained that speaker verification is an operation of determining whether a speaker is who he claims to be. In contrast, speaker identification is an operation of determining the identity of a speaker, for example, in a case where the speaker is not claiming to be anyone in particular. System 100 can be employed to perform speaker identification, for example, by determining which voice vector in data storage 140, and more specifically, which NB-to-WB mapped voice vector 225, is a best match to WB voice vector 212.

In review, speaker recognition system 125 performs a method that includes:
(a) WB scoring backend 215 obtaining WB voice vector 212, which was derived from WB input signal 115, which is in turn, from a voice that was sampled at a first sampling frequency (WB);

(b) NB-to-WB mapping module 230 obtaining NB voice vector 137 that was derived from a signal of a voice that was sampled at a second sampling frequency (NB);
(c) NB-to-WB mapping module 230 mapping NB voice vector 137 into a NB-to-WB mapped voice vector 225 in accordance with neural net mapping model 145; and
(d) WB scoring backend 215 comparing WB voice vector 212 to NB-to-WB mapped voice vector 225 to yield score 217, which indicates a probability that WB voice vector 212 and NB voice vector 137 originated from a same person.

The first sampling frequency (WB) is greater than the second sampling frequency (NB).

The first sampling frequency (WB) is about 16 kilohertz (kHz), and the second sampling frequency (NB) is about 8 kHz.

WB voice vector 212 is derived from speaker 101. When speaker 101 claims to be a particular person, the method further includes decision module 220 utilizing score 217 to verify that speaker 101 is that particular person.

For a case in which speaker 101 does not necessarily claim to be a particular person, decision module 220 may utilize score 217 to identify speaker 101.

Neural net mapping model 145 is trained by a process that includes:
(a) WB processing path 327 processing audio samples 306 with the first sampling frequency (WB) to produce target WB voice vectors 340;
(b) NB processing path 307 processing audio samples 306 with the second sampling frequency (NB) to produce input NB voice vectors 325; and
(c) regression neural network training 345 that creates neural net mapping model 145 by using a large set of target WB voice vectors 340 and input NB voice vectors 325, in pairs, as training data.

WB voice vectors 340 may be regarded as target voice vectors, and NB voice vectors 325 may be regarded as input voice vectors. The goal of the regression neural network training is to learn the mapping for converting the NB voice vectors 325 into approximated WB voice vectors.

The techniques described herein are exemplary, and should not be construed as implying any particular limitation on the present disclosure. It should be understood that various alternatives, combinations and modifications could be devised by those skilled in the art. For example, operations associated with the processes described herein can be performed in any order, unless otherwise specified or dictated by the operations themselves. The present disclosure is intended to embrace all such alternatives, modifications and variances that fall within the scope of the appended claims.

The terms "comprises" or "comprising" are to be interpreted as specifying the presence of the stated features, integers, operations or components, but not precluding the presence of one or more other features, integers, operations or components or groups thereof. The terms "a" and "an" are indefinite articles, and as such, do not preclude embodiments having pluralities of articles.

What is claimed is:
1. A method comprising:
training, during a training process, a neural net mapping model of a wideband (WB) speaker recognition system to perform narrowband-to-wideband (NB-to-WB) voice vector transformation exclusively using a WB training dataset that excludes known narrowband (NB) voice vectors associated with known speaker identities, the WB training dataset being composed of WB audio samples produced by sampling utterances of people at a WB sampling frequency, wherein training the neural net mapping model comprises:

processing one of the WB audio samples from the WB training dataset via a WB processing path to obtain a target WB voice vector:

processing the WB audio sample via a NB processing path, that is independent from the WB processing path, to obtain an input NB voice vector; and regressively training the neural net mapping model to transform the input NB voice vector into an approximated WB voice vector that reduces distortion between the approximated WB voice vector and the target WB voice vector, wherein the neural net mapping model is regressively trained using a loss function measuring the distortion between the approximated WB voice vector and the target WB voice vector; and after the training process has concluded, receiving an input WB voice vector of a speaker and performing, by the WB speaker recognition system based on the known NB voice vectors, WB speaker identification on the input WB voice vector using the trained neural net mapping model, the input WB voice vector produced by a user device directly sampling human voice audio of the speaker at the WB sampling frequency, wherein performing WB speaker identification on the input WB voice vector includes:

mapping the input WB voice vector to one of the known NB voice vectors;

using the trained neural net mapping model to transform the known NB voice vector into a representative WB voice vector:

comparing the input WB voice vector with the representative WB voice vector to determine a score that indicates a probability that the input WB voice vector and the known NB voice vector originated from a same person; and identifying the speaker based on a corresponding one of the known speaker identities associated with the known NB voice vector when the score exceeds a second threshold, wherein the trained neural net mapping model transforms the known NB voice vector into the representative WB voice vector during a time period between reception of the input WB voice vector and identification of the speaker by the WB speaker recognition system.

2. The method of claim 1, wherein processing the WB audio sample via the NB processing path to generate the input NB voice vector comprises down sampling the WB audio sample to obtain a NB audio sample and converting the NB audio sample into the input NB voice vector.

3. The method of claim 2, wherein the WB audio sample has a sampling frequency of 16 kilohertz (kHz) and the NB audio sample has a sampling frequency of 8 kHz.

4. The method of claim 1, wherein processing the WB audio sample via the WB processing path comprises:

extracting acoustic features from the WB audio sample; converting the extracted acoustic features into feature coefficients; and generating the target WB voice vector based on the feature coefficients using a deep neural network (DNN).

5. The method of claim 4, wherein the feature coefficients include Mel frequency cepstral coefficients (MFCCs).

6. The method of claim 4, wherein the feature coefficients include linear prediction cepstral coefficients (LPCCs).

7. The method of claim 4, wherein the feature coefficients include perceptual linear predictive (PLP) cepstral coefficients.

8. The method of claim 4, wherein the target WB voice vector includes floating-point values conveying biometric information associated with the WB audio sample.

9. The method of claim 8, wherein the target WB voice vector is a DNN-Embeddings wideband voice vector.

10. The method of claim 4, wherein the DNN is a time Delay DNN or a factorized time Delay DNN.

11. The method of claim 1, wherein training the neural net mapping model to transform the input NB voice vector into the approximated WB voice vector further comprises:

performing regression neural network training of the neural net mapping model to minimize distortion between the approximated WB voice vector and the target WB voice vector, wherein the distortion is measured using a Maximum Absolute Error or Mean Square Error loss function to compare the approximated WB voice vector with the target WB voice vector.

12. The method of claim 1, wherein the neural net mapping model is regressively trained using a loss function measuring the distortion between the approximated WB voice vector and the target WB voice vector.

13. The method of claim 1, wherein the known NB voice vectors are derived from NB audio samples produced from directly sampling human voice audio at a NB sampling frequency, and wherein the WB training dataset excludes the NB audio samples.

14. A system comprising:

a processor; and a memory storing programming instructions for execution by the processor, wherein the programming instructions, upon execution by the processor, cause the processor to perform the following operations:

training, during a training process, a neural net mapping model of a wideband (WB) speaker recognition system to perform narrowband-to-wideband (NB-to-WB) voice vector transformation exclusively using a WB training dataset that excludes known narrowband (NB) voice vectors associated with known speaker identities, the WB training dataset being composed of WB audio samples produced by sampling utterances of people at a WB sampling frequency, wherein training the neural net mapping model comprises;

processing one of the WB audio samples from the WB training dataset via a WB processing path to obtain a target WB voice vector:

processing the WB audio sample via a NB processing path, that is independent from the WB processing path, to obtain an input NB voice vector; and regressively training the neural net mapping model to transform the input NB voice vector into an approximated WB voice vector that reduces distortion between the approximated WB voice vector and the target WB voice vector, wherein the neural net mapping model is regressively trained using a loss function measuring the distortion between the approximated WB voice vector and the target WB voice vector; and after the training process has concluded, receiving an input WB voice vector of a speaker and performing, by the WB speaker recognition system based on the known NB voice vectors, WB speaker identification on the input WB voice vector using the trained neural net mapping model, the input WB voice vector produced by a user device directly sampling human voice audio of the speaker at the WB sampling frequency, wherein performing WB speaker identification on the input WB voice vector includes:

mapping the input WB voice vector to one of the known NB voice vectors;

using the trained neural net mapping model to transform the known NB voice vector into a representative WB voice vector:

comparing the input WB voice vector with the representative WB voice vector to determine a score that indicates a probability that the input WB voice vector and the known NB voice vector originated from a same person; and identifying the speaker based on a corresponding one of the known speaker identities associated with the known NB voice vector when the score exceeds a second threshold, wherein the trained neural net mapping model transforms the known NB voice vector into the representative WB voice vector during a time period between reception of the input WB voice vector and identification of the speaker by the WB speaker recognition system.

15. The system of claim 14, wherein processing the WB audio sample via the NB processing path to generate the input NB voice vector includes down sampling the WB audio sample to obtain a NB audio sample and converting the NB audio sample into the input NB voice vector.

16. The system of claim 14, wherein processing the WB audio sample via the WB processing path includes:

extracting acoustic features from the WB audio sample;

converting the extracted acoustic features into feature coefficients; and generating the target WB voice vector based on the feature coefficients using a deep neural network (DNN).

17. The system of claim 16, wherein the feature coefficients include Mel frequency cepstral coefficients (MFCCs).

18. The system of claim 16, wherein the feature coefficients include linear prediction cepstral coefficients (LPCCs).

19. The system of claim 16, wherein the feature coefficients include perceptual linear predictive (PLP) cepstral coefficients.

20. A storage device that is non-transitory, comprising instructions that are readable by a processor to cause said processor to perform operations of:

training, during a training process, a neural net mapping model of a wideband (WB) speaker recognition system to perform narrowband-to-wideband (NB-to-WB)

voice vector transformation exclusively using a WB training dataset that excludes known narrowband (NB) voice vectors associated with known speaker identities, the WB training dataset being composed of WB audio samples produced by sampling utterances of people at a WB sampling frequency, wherein training the neural net mapping model comprises;

processing one of the WB audio samples from the WB training dataset via a WB processing path to obtain a target WB voice vector;

processing the WB audio sample via a NB processing path, that is independent from the WB processing path, to obtain an input NB voice vector, and regressively training the neural net mapping model to transform the input NB voice vector into an approximated WB voice vector that reduces distortion between the approximated WB voice vector and the target WB voice vector, wherein the neural net mapping model is regressively trained using a loss function measuring the distortion between the approximated WB voice vector and the target WB voice vector; and after the training process has concluded, receiving an input WB voice vector of a speaker and performing, by the WB speaker recognition system based on the known NB voice vectors, WB speaker identification on the input WB voice vector using the trained neural net mapping model, the input WB voice vector produced by a user device directly sampling human voice audio of the speaker at the WB sampling frequency, wherein performing WB speaker identification on the input WB voice vector includes:

mapping the input WB voice vector to one of the known NB voice vectors;

using the trained neural net mapping model to transform the known NB voice vector into a representative WB voice vector;

comparing the input WB voice vector with the representative WB voice vector to determine a score that indicates a probability that the input WB voice vector and the known NB voice vector originated from a same person; and identifying the speaker based on a corresponding one of the known speaker identities associated with the known NB voice vector when the score exceeds a second threshold, wherein the trained neural net mapping model transforms the known NB voice vector into the representative WB voice vector during a time period between reception of the input WB voice vector and identification of the speaker by the WB speaker recognition system.

* * * * *